(12) United States Patent  
Takamura et al.

(10) Patent No.: US 8,079,802 B2
(45) Date of Patent: Dec. 20, 2011

(54) GAS TURBINE

(75) Inventors: Keita Takamura, Hyogo (JP); Shinya Hashimoto, Hyogo (JP); Masanori Yuri, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 842 days.

(21) Appl. No.: 12/164,786

(22) Filed: Jun. 30, 2008

(65) Prior Publication Data

US 2009/0324386 A1 Dec. 31, 2009

(51) Int. Cl.
F01D 5/14 (2006.01)
F03D 11/00 (2006.01)
F04D 29/38 (2006.01)

(52) U.S. Cl. .......................................... 415/115; 415/1
(58) Field of Classification Search ................ 415/1, 115
See application file for complete search history.

(56) References Cited

U.S. PATENT DOCUMENTS

| | | | |
|---|---|---|---|
| 2,618,756 A * | 11/1952 | Fechheimer | 310/54 |
| 3,325,993 A * | 6/1967 | Gulyas | 60/39.35 |
| 4,102,603 A | 7/1978 | Smith et al. | |
| 4,967,552 A | 11/1990 | Kumata et al. | |
| 5,327,719 A * | 7/1994 | Mazeaud et al. | 60/785 |
| 5,340,274 A * | 8/1994 | Cunha | 415/115 |
| 5,819,524 A * | 10/1998 | Bosley et al. | 60/39.465 |
| 6,772,581 B2 * | 8/2004 | Ojiro et al. | 60/39.182 |
| 2006/0133921 A1 * | 6/2006 | Hays | 415/84 |

FOREIGN PATENT DOCUMENTS

| | | |
|---|---|---|
| JP | 59-41001 B2 | 10/1984 |
| JP | 61-226502 A | 10/1986 |
| JP | 62-182444 A | 8/1987 |
| JP | 63-159626 A | 7/1988 |
| JP | 11-117702 A | 4/1999 |

OTHER PUBLICATIONS

International Search Report of PCT/JP2009/057983, dated of mailing Jun. 23, 2009.

* cited by examiner

*Primary Examiner* — S. V Clark
(74) *Attorney, Agent, or Firm* — Westerman, Hattori, Daniels & Adrian, LLP (57) ABSTRACT

A gas turbine includes a shaft directional passage provided to a rotating member that rotates along a central axis of a rotor, which is a rotating axis of the rotating member, about the central axis, or a rotating axis of the rotating member, and in which cooling air flows along a direction of the rotating axis of the rotor, a plurality of radial directional passages provided in a circumferential direction of the rotating member, and compressing the cooling air by being provided outwardly from the center of the rotor, in which one end of each of the radial directional passages is communicated with the shaft directional passage and the other end is communicated with exterior of the rotating member.

7 Claims, 9 Drawing Sheets

GAS TURBINE

BACKGROUND OF THE INVENTION

1. Field of the Invention

The present invention relates to a gas turbine, and more particularly, to a gas turbine that cools a turbine rotor blade.

2. Description of the Related Art

Conventionally, a gas turbine is an apparatus that extracts energy from combustion gas generated by combusting air and fuel therein. A gas turbine rotates a turbine by using energy of combustion gas generated by combusting fuel and compressed air, and outputs rotation energy from the rotor. The combustion gas is, however, supplied to the turbine while the combustion gas is hot. Therefore, the rotor blade of the turbine is also exposed to hot atmosphere. To address the issue, for example in Japanese Patent Application Laid-open No. S61-226502, a gas turbine is disclosed in which, air is supplied from a compressor, which is a supply source of cooling air, to a rotor blade, which is a supply destination of cooling air, through a central hole or a hole provided along a central axis of a rotor thus the rotor blade is cooled.

In the technology described in Japanese Patent Application Laid-open No. S61-226502, air compressed by the compressor via the central hole of the rotor flows from the compressor to the turbine via an internal passage, and is thus supplied to the rotor blade as cooling air. In Japanese Patent Application Laid-open No. 61-226502, some of air is extracted from a disk or a rotating member of the compressor to a cavity located in the compressor, and is supplied to the rotor blade passage via the internal passage. Therefore, it is difficult to adjust amount of the extracted air while the gas turbine is in operation. Thus, during the maximum load operation, cooling air more than flow rate required for cooling the rotor blade may be extracted from the compressor. As a result, a thermal efficiency of the gas turbine may be reduced.

In the technology described in Japanese Patent Application Laid-open No. S59-41001, similar to the technology described in Japanese Patent Application Laid-open No. S61-226502, air is supplied from a compressor to a rotor blade through an internal passage. Thus, the technology described in Japanese Patent Application Laid-open No. S59-41001 also has the same problem. In the technology described in Japanese Patent Application Laid-open No. H11-117702, coolant is supplied from a turbine rotor shaft end. The technology is meant for recovery of coolant. Therefore an object thereof is not the same as that of the present application.

In general, amount of cooling air necessary for cooling the rotor blade differs in accordance with load of a gas turbine. More specifically, during high load operation, cooling capacity of a gas turbine needs to be increased by supplying high pressure air to a rotor blade and thus securing necessary amount of air. During low load operation, amount of cooling air needs to be reduced. Therefore, deterioration of thermal efficiency of the gas turbine needs to be prevented by supplying comparatively low pressure air thereto and thus preventing consuming unnecessary air. In Japanese Patent Application Laid-open No. H11-117702, any means is not disclosed for adjusting amount of air in a gas turbine in which load thereof fluctuates.

SUMMARY OF THE INVENTION

It is an object of the present invention to at least partially solve the problems in the conventional technology.

A gas turbine according to an aspect of the present invention includes: a shaft directional passage provided to a rotating member that rotates along a central axis of a rotor, which is a rotating axis of the rotating member, about the central axis, or a rotating axis of the rotating member, and in which cooling air flows along a direction of the rotating axis of the rotor; a plurality of radial directional passages provided in a circumferential direction of the rotating member, and compressing the cooling air by being provided outwardly from center of the rotor, in which one end of each of the radial directional passages is communicated with the shaft directional passage and the other end is communicated with exterior of the rotating member; and an external passage including an air amount regulating unit, in which one end thereof is communicated with an air supply for taking air in and the other end is communicated with the radial directional passage to introduce the cooling air.

In a gas turbine operating method according to another aspect of the present invention, an air supply is switched according to load of a gas turbine including: a shaft directional passage provided to a rotating member that rotates along a central axis of a rotor, which is a rotating axis of the rotating member, about the central axis, or a rotating axis of the rotating member, and in which cooling air flows along a direction of the rotating axis of the rotor; a plurality of radial directional passages provided in a circumferential direction of the rotating member, and compressing the cooling air by being provided outwardly from center of the rotor, in which one end of each of the radial directional passages is communicated with the shaft directional passage and the other end is communicated with exterior of the rotating member; and an external passage including a switching unit that switches the air supply and formed of a plurality of passages, in which one end of each of the passages is communicated with the air supply for taking air in to introduce the cooling air and the other end is communicated with the radial directional passages via a shaft end seal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described in greater detail with reference to the accompanying drawings. The present invention is not limited to a best mode embodiment for implementing the present invention (hereinafter, "embodiment"). The constituent elements described in embodiments below include various modifications that will readily occur to those skilled in the art, modifications substantially similar thereto, or what is called equivalent range thereof.

Figure 1:
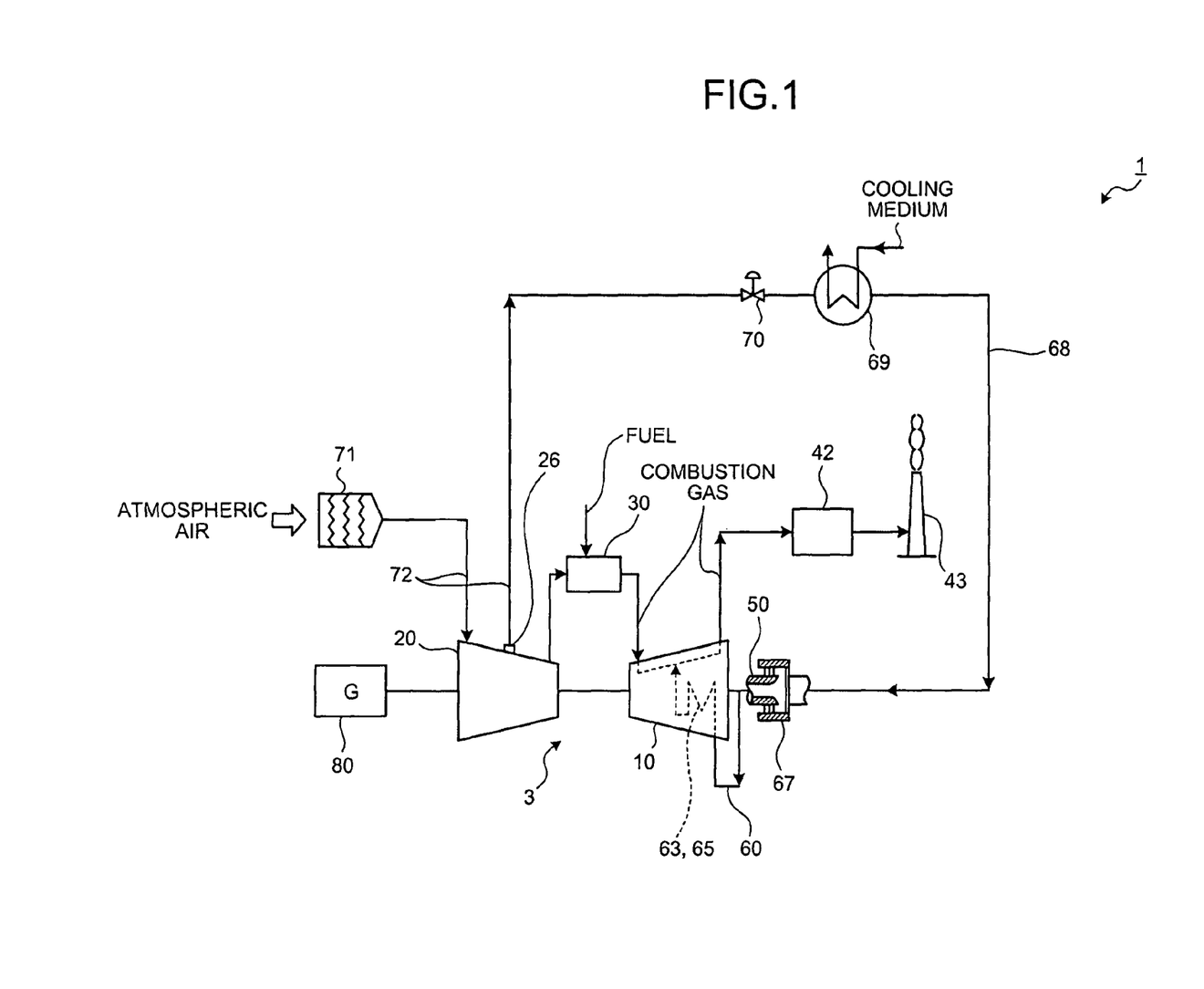
FIG. 1 is an overall view of a gas turbine system according to a first embodiment of the present invention.
Figure 2:
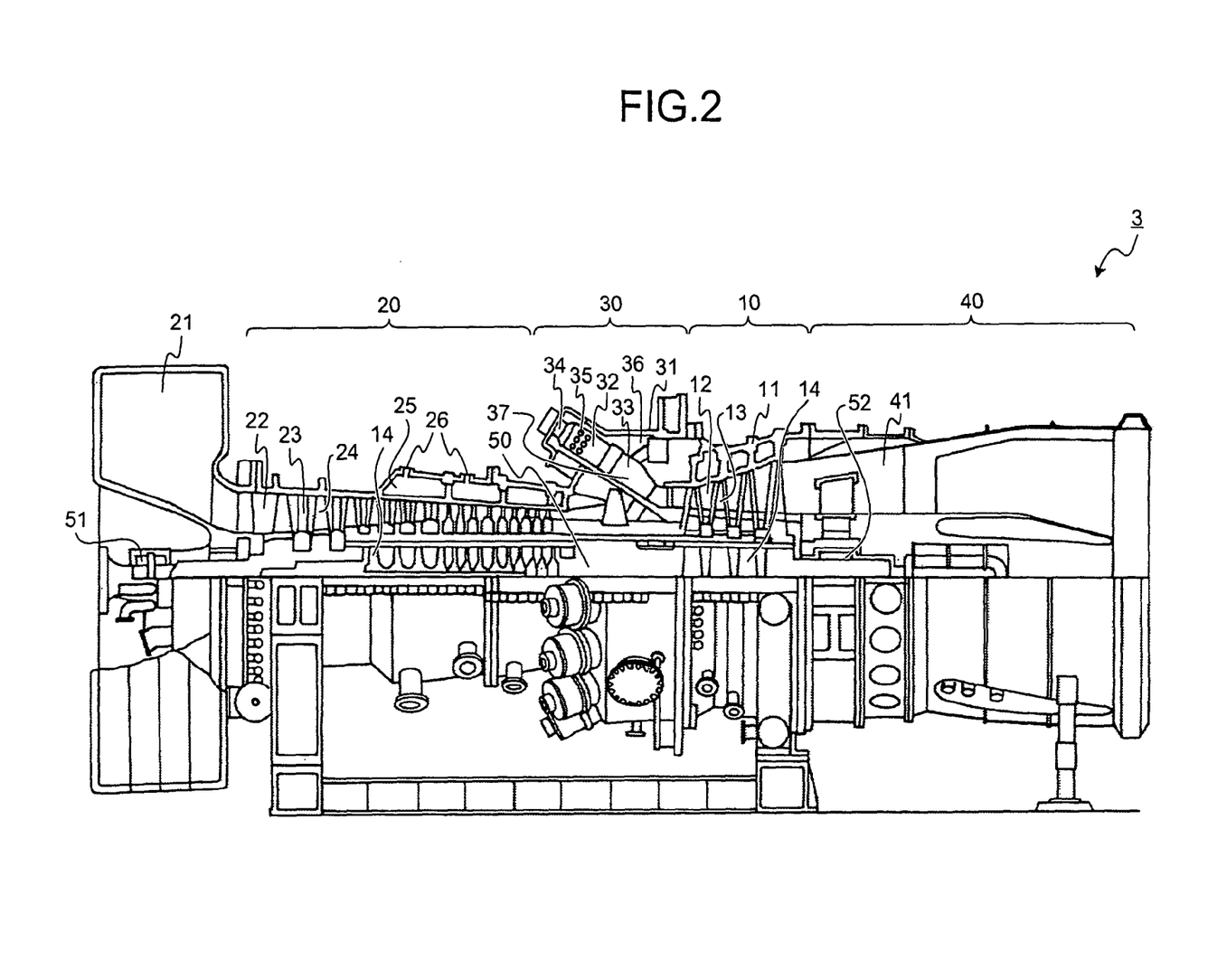
FIG. 2 is a schematic for explaining a configuration of a gas turbine 3 according to the first embodiment.

FIG. 1 is an overall view of a gas turbine system according to a first embodiment of the present invention. FIG. 2 is a schematic for explaining a configuration of a gas turbine 3 according to the first embodiment. As shown in FIGS. 1 and 2, combustion air supplied to the gas turbine 3 according to the present embodiment is introduced to a compressor 20 via an air filter 71. The combustion air compressed by the compressor 20 at a predetermined pressure is supplied to a combustion chamber 30, and in the combustion chamber 30 the combustion air is mixed with fuel and is combusted. The combustion gas generated in the combustion chamber 30 is introduced to a turbine 10. Then, when the combustion gas flows down a turbine stationary blade 12 or a turbine rotor blade 13, heat energy is converted to rotation energy of a rotor 50 of the turbine 10, and the rotation energy is extracted as electric power from a power generator 80.

The gas turbine 3 according to the present embodiment includes the compressor 20, the combustion chamber 30, the turbine 10, and an exhaust hood 40, sequentially in the described order from upstream to downstream of flow of fluid as shown in FIG. 2. The compressor 20 applies pressure to air and the pressed air is transmitted to the combustion chamber 30. Then, the combustion chamber 30 supplies fuel to the air to ignite the air. The turbine 10 converts energy of the combustion gas sent out from the combustion chamber 30 into rotation energy.

The compressor 20 includes an air intake 21, a compressor housing 22, compressor stationary blades 23, compressor rotor blades 24, and an air extraction manifold 25. The air intake 21 functions as an air inlet that delivers air introduced from the air filter 71 shown in FIG. 1 to the compressor housing 22.

In the compressor housing 22, a plurality of compressor stationary blades 23 and a plurality of compressor rotor blades 24 are alternately provided. Air compressed by the compressor 20 is brought to a cylinder 36 in the combustion chamber 30. The air extraction manifold 25 is provided outside the compressor stationary blades 23, and a function thereof is to temporarily accumulate compressed air extracted from an intermediate area of the compressor 20 for cooling the turbine stationary blades and turbine rotor blades. The air extraction manifold 25 includes a compressor air extraction opening 26 that connects to external piping. A plurality of air extraction openings may be provided as the compressor air extraction openings 26. For example, the compressor air extraction openings 26 may include a low pressure air extraction opening for low pressure air extracted from a low pressure intermediate area of the compressor and a high pressure air extraction opening for high pressure air extracted from a high pressure intermediate area of the compressor, and the low pressure air extraction opening or the high pressure air extraction opening may be used optionally according to operation status thereof.

The combustion chamber 30 includes a housing 31, a combustor liner 32, and a tail pipe 33. In the housing 31, the cylinder 36 is formed. The combustor liner 32 is formed in a generally cylindrical shape and is provided in the cylinder 36 as a passage for combustion gas. In the cylinder 36, the tail pipe 33 is provided as a passage for combustion gas. The tail pipe 33 is formed in a generally cylindrical shape, and in the tail pipe 33 a combustion zone 37 is formed in which air and fuel are combusted.

The tail pipe 33 is connected to one of the axial direction ends of the combustor liner 32. At the other end of the combustor liner 32 opposite to the tail pipe 33, a fuel injection nozzle 34 that injects fuel into the inside of the combustor liner 32 is provided. On the circumferential surface of the combustor liner 32, a plurality of combustor liner air intakes 35 are formed for introducing compressed air into the inside of the combustor liner 32.

The turbine 10 includes a turbine casing 11, the turbine stationary blades 12, and the turbine rotor blades 13. In the turbine casing 11, a plurality of turbine stationary blades 12 and a plurality of turbine rotor blades 13 are alternately provided. The exhaust hood 40 includes an exhaust air diffuser 41 connected to the turbine 10. The exhaust air diffuser 41 converts dynamic pressure of combustion gas having passed through the turbine 10, i.e., exhaust gas, to static pressure.

The gas turbine 3 includes the rotor 50 as a rotating member. The rotor 50 is provided such that the rotor 50 penetrates the centers of the compressor 20, the combustion chamber 30, the turbine 10, and the exhaust hood 40. The rotor 50 is supported so that the end thereof on the side of the compressor 20 is rotatably supported by a bearing 51 and the end thereof on the side of the exhaust hood 40 is rotatably supported by a bearing 52. A plurality of disks 14 are fixed on the rotor 50. The compressor rotor blades 24 and the turbine rotor blades 13 are connected to the disks 14. To one of the ends of the rotor 50 on the side of the compressor 20, a drive shaft of a power generator (not shown) is connected. In the configuration, the gas turbine 3 drives the power generator 80 to generate power.

Figure 4:
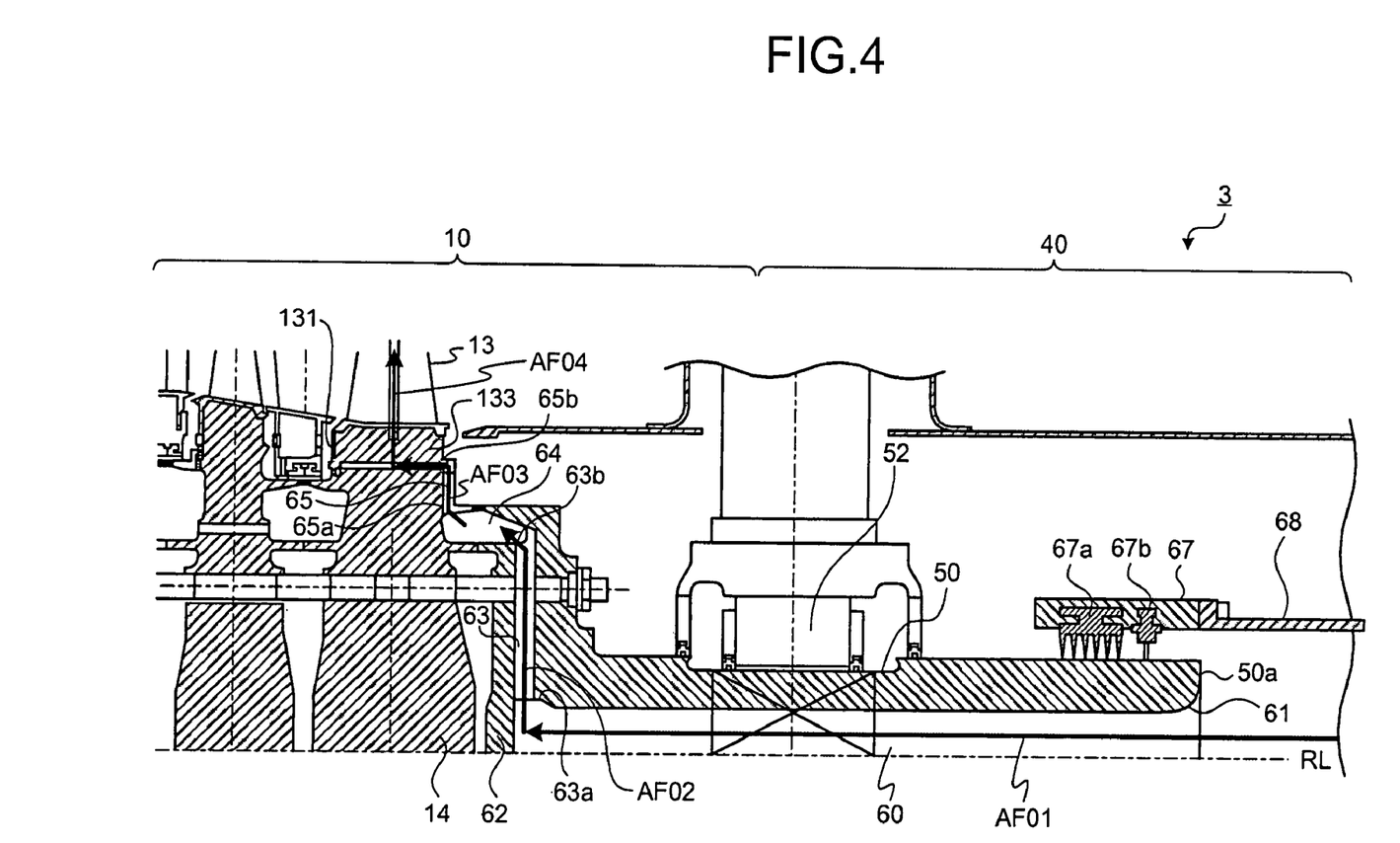
FIG. 4 is a cross sectional view for schematically illustrating a passage in which cooling air flows.

The gas turbine 3 supplies compressed air as cooling air in an intermediate area of the compressor 20 as a high pressure zone to a shaft directional passage 60. As shown in FIG. 1, the gas turbine 3 includes a shaft end seal 67, an external passage 68, a cooler 69 as a cooling air cooling unit, and an air flow rate regulating valve 70. The shaft end seal 67 is mounted thereon such that the shaft end seal 67 covers a cooling air inlet 61 as well as communicates with the external passage 68. Thus, the cooling air inlet 61 and the external passage 68 communicate with each other via the shaft end seal 67 as shown in FIG. 4.

More specifically, the external passage 68 is connected, for example, to the compressor air extraction openings 26 provided at the air extraction manifold 25 of the compressor 20. The cooler 69 is provided at the external passage 68. Now, a temperature of the compressed air extracted from the compressor 20 is higher than a temperature of the atmospheric air. Therefore, the cooler 69 cools cooling air flowing inside the external passage 68.

The air flow rate regulating valve 70 is provided on the external passage 68, and regulates flow rate of cooling air flowing inside the external passage 68. A flow rate of the cooling air extracted from the compressor 20 and flowing inside the external passage 68 fluctuates according to operation status of the gas turbine 3. More specifically, the higher an operating load of the gas turbine is, the more cooling air flows inside the external passage 68.

In the configuration, the cooling air extracted from the compressor 20 is supplied to the turbine 10 via the external passage 68. Then, a flow rate of the cooling air is regulated by the air flow rate regulating valve 70 and the cooling air is cooled by the cooler 69. The cooling air cooled by the cooler 69 is introduced to the cooling air inlet 61 via the external passage 68 and the shaft end seal 67.

The combustion gas passing through a final area of the turbine is introduced from the exhaust hood 40 to an exhaust heat recovering unit 42, and after heat recovery is performed, the combustion gas is emitted from a chimney 43 to atmospheric air. The interiors of the turbine stationary blades 12 and the turbine rotor blades 13 through which hot combustion gas flows are cooled by the cooling air, to avoid damage on blades that may be caused by the hot combustion gas. The cooling air cools the turbine stationary blades 12 and the turbine rotor blades 13, and then is discharged to the combustion gas finally.

Typically, some of combustion air compressed at the compressor 20 is extracted, as air supply of cooling air, from an intermediate area of the compressor 20, and is used as cooling air. In recent years, a gas turbine that has a comparatively high thermal efficiency is needed. Therefore, hotter combustion gas is more likely used. Thus, necessity is increasing, compared with the conventional cooling, for cooling the turbine rotor blades 13 in a posterior area of the turbine 10 located downstream along the flow of the combustion gas.

In FIG. 1, some of the extracted air in the compressor 20 is extracted, as air supply, from the compressor air extraction openings 26 to cool the turbine rotor blades 13 in a posterior area of the turbine. The cooling air extracted from the compressor air extraction openings 26 flows through the external passage 68, and then is supplied to the turbine 10 from the side of the shaft end of the rotor 50 of the turbine 10.

The air extracted from the compressor air extraction openings 26 is cooled at the cooler 69 at an appropriate temperature. Therefore, as a cooling medium, for example, cooling water is used. Comparatively low temperature fluid such as boiler working fluid in the exhaust heat recovering unit 42 in the gas turbine system can also be used as cooling medium of the cooler 69. Then, energy loss of the whole system is more reduced because heat recovery is thus performed. Regulation of a flow rate of the cooling air is performed by the air flow rate regulating valve 70, or an air flow rate adjusting unit, according to the load of the gas turbine. Adjustment of temperature of cooling air is performed by adjustment of cooling medium flow rate of the cooler 69 or by adjustment of amount of air of bypassing the cooler according to the load of the gas turbine.

The cooling air to be flowed in the external passage 68 is supplied to the turbine 10 via the shaft end seal 67 located at the downstream end of the external passage 68. An air flow rate adjusting unit includes the air flow rate regulating valve 70 that can control air flow rate continuously as well as other units for adjusting flow rate of cooling air manually such as a hand valve and an orifice.

Thus, the gas turbine system 1 includes the gas turbine 3 including the compressor 20, the turbine 10, the combustion chamber 30, and the exhaust hood 40 shown in FIG. 2, the external passage 68 that provides cooling air disposed around the gas turbine 3 to the turbine, the cooler 69, and the air flow rate regulating valve 70.

The gas turbine system 1 is configured such that the shaft end seal 67 and the external passage 68 can be removed or such that either one of atmospheric air or the compressor 20 can be selectively used as supply source of cooling air. Thus, air supply or supply source of cooling air can be switched according to operating status of the gas turbine 3.

The gas turbine 3, as described above, has a function by which the turbine rotor blades 13 can be cooled by the cooling air. The cooling air is used not only for cooling the turbine rotor blades 13 but also the turbine stationary blades 12 and other components of the gas turbine. In the present embodiment, particularly the rotor blades in a final area of the turbine rotor blades 13 are cooled by the cooling air. Rotor blades that are cooled, however, are not limited thereto.

Figure 3:
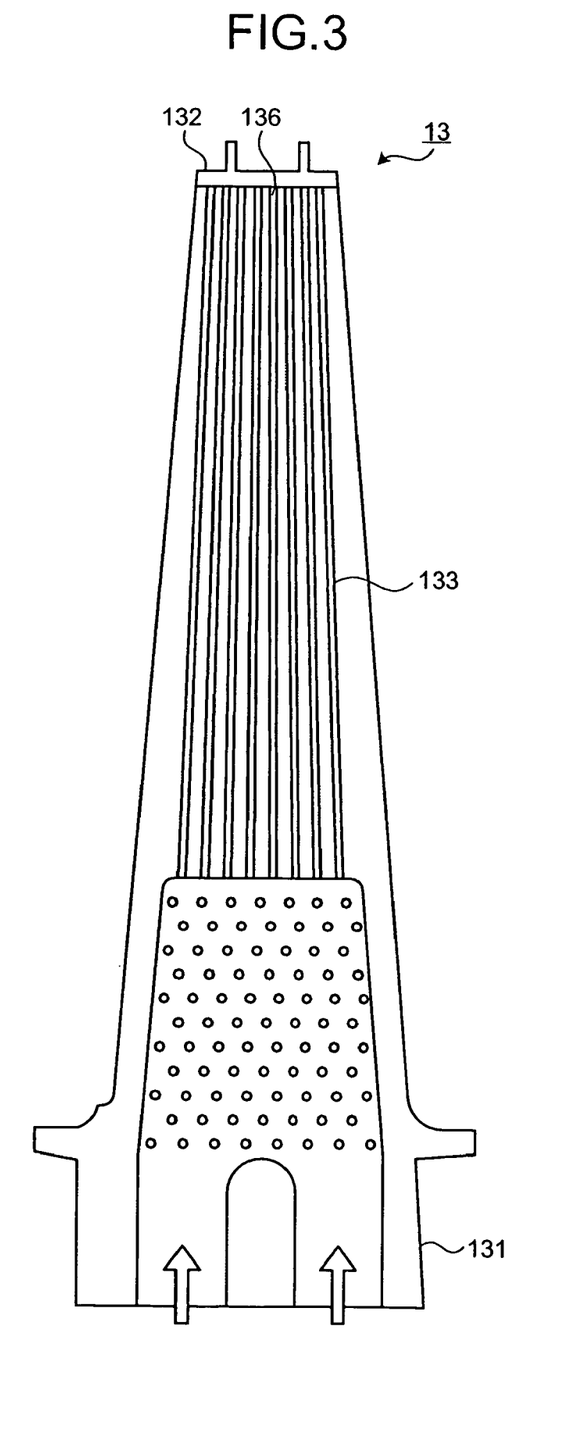
FIG. 3 is a cross sectional view for schematically illustrating an example of a rotor blade in a posterior area of the gas turbine according to the first embodiment.

FIG. 3 is a cross sectional view for schematically illustrating an example of a rotor blade in a posterior area of the gas turbine according to the first embodiment. As shown in FIG. 3, the turbine rotor blades 13 includes a base 131, a tip section 132 that is a tip end of a turbine rotor blade 13, and cooling passages 133 that are holes. The turbine rotor blades 13 are mounted on the circumference of disk 14 shown in FIG. 2 by each base 131. The cooling passages 133 are formed such that the cooling passages 133 are air-hole spaces open into the base 131. A plurality of cooling passages 133 are formed generally linearly from the base 131 to the tip section 132.

In the present embodiment, a plurality of cooling passages 133 are formed such that the cooling passages 133 are generally linear from the base 131 to the tip section 132. The present embodiment, however, is not limited thereto. If the cooling passages 133 are provided in a plurality of the turbine rotor blades 13 provided in the turbine 10 shown in FIG. 2, the cooling passages 133 may be provided for example, in curved shape (as so-called serpentine passages).

The cooling air flows into the cooling passages 133 from the base 131 side of the turbine rotor blades 13, where the cooling air performs heat exchange between the wall surfaces inside the cooling passages 133. Then, the cooling air flows through the cooling passages 133 to the tip section 132 side of the turbine rotor blades 13. The cooling air that thus flows through the cooling passages 133 performs heat exchange with the turbine rotor blades 13 and cools the turbine rotor blades 13.

FIG. 4 is a cross sectional view for schematically illustrating a passage in which cooling air flows. As shown in FIG. 4, the gas turbine 3 according to the present embodiment includes the shaft directional passage 60, the cooling air inlet 61, a swirler 62 as swirl adding means, a first radial directional passage 63, a cavity 64, and a second radial directional passage 65.

The shaft directional passage 60 is formed in cylindrical shape along a central axis RL of the rotor 50 on the side of the exhaust hood 40. In the present embodiment, as a preferred embodiment, the shaft directional passage 60 is formed such that the central axis of the rotor is the same as the central axis of the shaft directional passage 60. One of the ends of the shaft directional passage 60 or the cooling air inlet 61 is communicated with the external passage 68 shown in FIG. 1.

The cooling air inlet 61 is formed, for example, at the end 50a of the rotor 50 on the side of the exhaust hood 40 in a bell-mouth shape. Bell-mouth shape is a shape, in which the shape is tapered such that curvature thereof is generally bell-shaped, and a bore diameter of the cooling air inlet 61 is bigger upstream of flow of the cooling air and the bore diameter is smaller downstream of the flow. Thus, the cooling air inlet 61 can efficiently introduce the cooling air from the external passage 68 to the shaft directional passage 60.

Figure 5A:
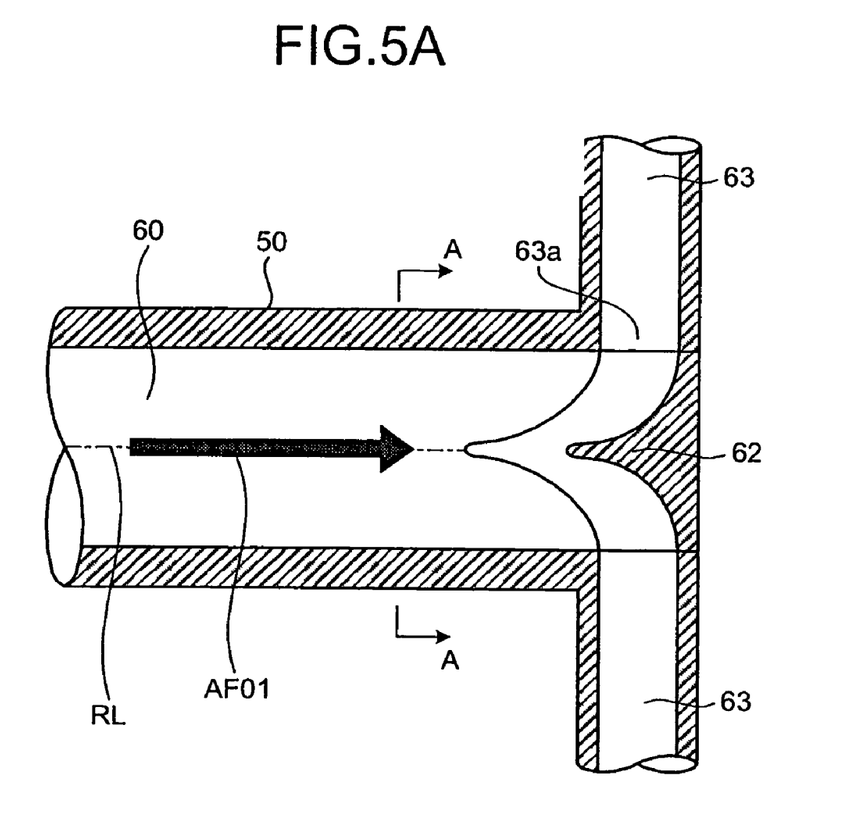
FIG. 5A is a cross sectional view for schematically illustrating a swirler according to the first embodiment taken along a plane including the central axis thereof.
Figure 5B:
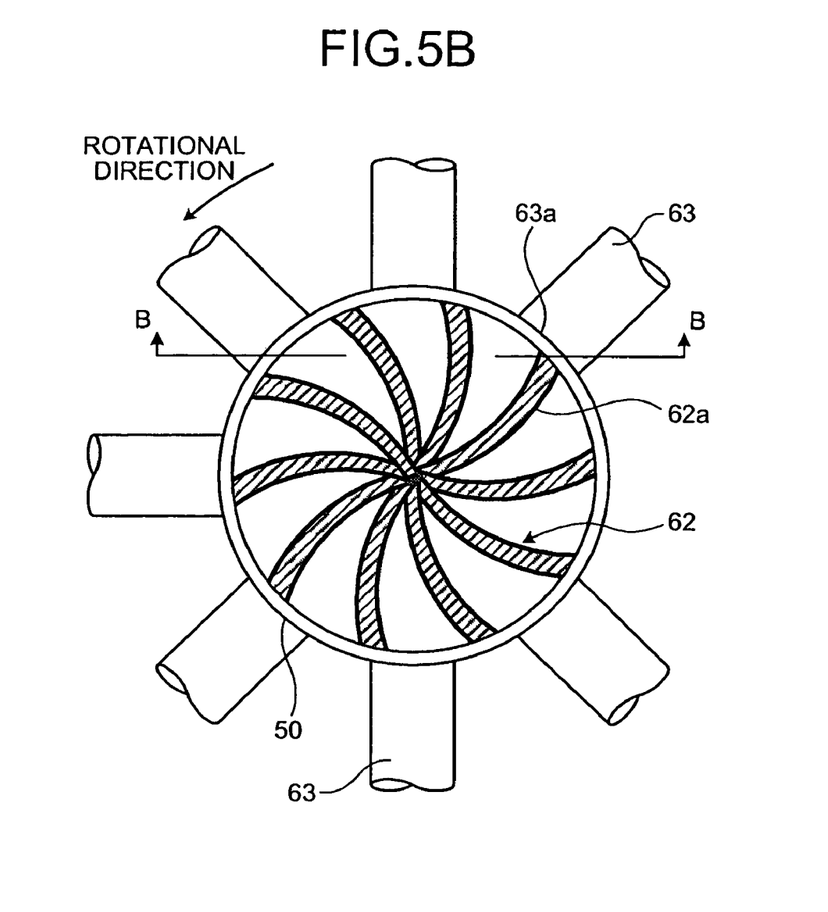
FIG. 5B is a cross sectional view for schematically illustrating the swirler taken along a plane A-A in FIG. 5A.
Figure 5C:
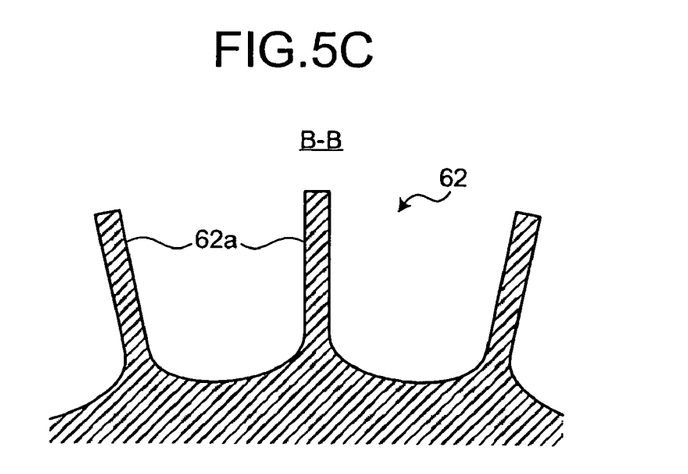
FIG. 5C is a cross sectional view for schematically illustrating the swirler taken along a plane B-B in FIG. 5B.

FIG. 5A is a cross sectional view for schematically illustrating a swirler according to the first embodiment taken along a plane including the central axis thereof. FIG. 5B is a cross sectional view for schematically illustrating the swirler taken along a plane A-A in FIG. 5A. FIG. 5C is a cross sectional view for schematically illustrating the swirler taken along a plane B-B in FIG. 5B.

The swirler 62 shown in FIGS. 5A, 5B, and 5C is provided on one of the ends of the shaft directional passage 60 on the opposite side of the cooling air inlet 61 shown in FIG. 4. The swirler 62 is a rotating member that rotates with the rotor 50 being fixed to the rotor 50. The swirler 62 includes a guide plate 62a. The guide plate 62a provides a swirl in the rotational direction of the rotor 50 to the cooling air inside the shaft directional passage 60 by rotation of the swirler 62. The cooling air is provided with velocity component in the rotational direction of the rotor 50 by the swirler 62, and thus flows. The swirler 62 may be provided at the cooling air inlet 61 or the other end of the shaft directional passage 60.

The bigger the distance between the swirler 62 and a cavity side opening 65a is, the smaller a swirl provided to the cooling air by the swirler 62 is. Therefore, the swirler 62 is preferably provided near the first radial directional passage 63.

As shown in FIG. 4, at the end of the external passage 68 that is communicated with the cooling air inlet 61, the shaft end seal 67 is provided that connects the shaft directional passage 60 that is driven rotationally and the external passage 68 that is a static structure such that the cooling air is introduced to the side of the turbine 10 without leakage of the cooling air.

The shaft end seal 67 is a tight seal between a rotating body and a resting body having a seal structure including a combination of labyrinth seal 67a and a brush seal 67b. The shaft end seal 67 prevents the cooling air from leaking from the connecting portion between the shaft directional passage 60 and the external passage 68. As a seal structure, the shaft end seal 67 may include a leaf seal or other seal members instead of a brush seal.

Figure 6A:
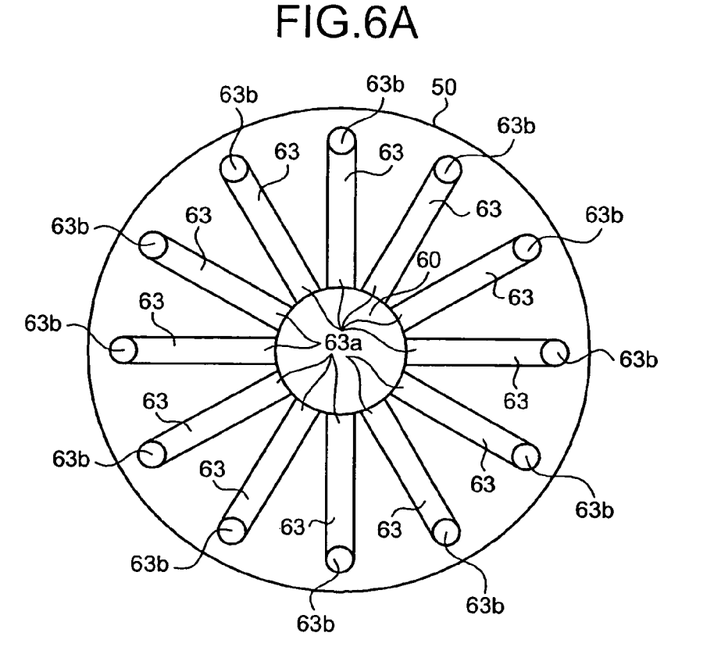
FIG. 6A is a cross sectional view for schematically illustrating a first radial directional passages according to the first embodiment.
Figure 6B:
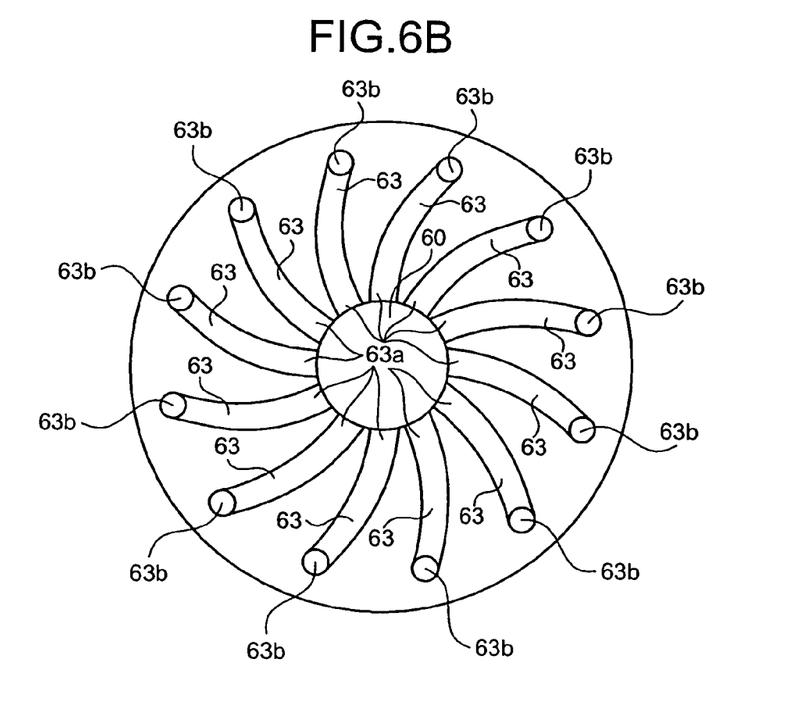
FIG. 6B is a cross sectional view for schematically illustrating another first radial directional passage according to the first embodiment.
Figure 6C:
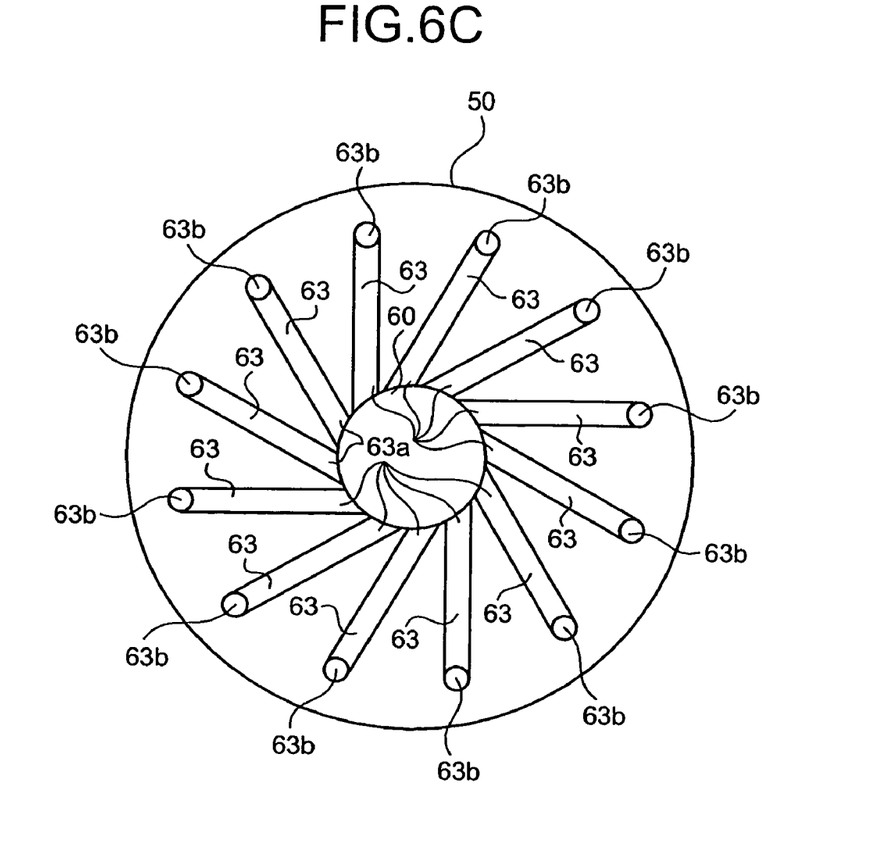
FIG. 6C is a cross sectional view for schematically illustrating still another first radial directional passage according to the first embodiment.

FIG. 6A is a cross sectional view for schematically illustrating the first radial directional passages according to the first embodiment. FIG. 6B is a cross sectional view for schematically illustrating another first radial directional passage according to the first embodiment. FIG. 6C is a cross sectional view for schematically illustrating still another first radial directional passage according to the first embodiment. FIGS. 6A to 6C are cross sectional views taken along a plane orthogonal to the central axis RL of the rotor 50.

As shown in FIG. 6A, a plurality of first radial directional passages 63 are formed at the rotor 50 outwardly from the center of the rotor 50. The first radial directional passages 63 are formed, for example, as holes provided radially from the center of the shaft directional passage 60. Each of the first radial directional passages 63 has a cooling air inletting side opening 63a and a cooling air emitting side opening 63b. The cooling air inletting side opening 63a opens to the shaft directional passage 60. The cooling air emitting side opening 63b opens to the cavity 64 as shown in FIG. 4.

In the present embodiment, the first radial directional passages 63 are configured such that the first radial directional passages 63 are formed radially from the center of the shaft directional passage 60. The present embodiment, however, is not limited thereto. For example, as shown in FIG. 6B, the first radial directional passages 63 may be formed in curbed shape. Alternately, for example, as shown in FIG. 6C, an imaginary extended line of each of the first radial directional passages 63 may be out of the center of the shaft directional passage 60.

As shown in FIG. 4, the cavity 64 is formed at the rotor 50 near the disk 14 as a rotating member to which one of the turbine rotor blades 13 is attached. The disk 14 is a rotating member that rotates with the rotor 50 about the central axis RL as the rotating axis of the disk 14. The cavity 64 temporarily accumulates cooling air therein supplied from the first radial directional passages 63, and supplies the cooling air to the second radial directional passages 65 that open to the cavity 64. In the present embodiment, the first radial directional passages 63 and the second radial directional passages 65 are communicated with each other via the cavity 64. The present embodiment is not limited thereto. The first radial directional passages 63 and the second radial directional passage 65 may be communicated with each other through tubular passages without the cavity 64 therebetween.

A plurality of second radial directional passages 65 are provided to the disk 14 outwardly from the center of the disk 14. The second radial directional passage 65 are configured such that the cavity side opening 65a provided at one of the ends of each of the second radial directional passages 65 opens to the cavity 64 and a rotor blade side opening 65b provided at the other end opens to the cooling passage 133.

In the configuration, when the gas turbine 3 starts operating and the rotor 50 starts to rotate, the cooling air inside the shaft directional passage 60 is provided with a swirl in the rotational direction of the rotor 50 by the swirler 62, which rotates together with the rotor 50. The cooling air is introduced to the first radial directional passages 63 via the cooling air inletting side opening 63a provided near the swirler 62. The first radial directional passages 63 rotate about the central axis RL. As a result, a pressure of the cooling air introduced to the first radial directional passages 63 is raised due to a pumping effect similar to a centrifugal compressor. A cooling air flow AF02 shown by an arrow in FIG. 4 flows from the shaft directional passage 60 to the cooling air inletting side opening 63a, and thus flows from the center of the radial direction to the outside of the radial direction.

The cooling air flowing inside the first radial directional passages 63 is introduced to the cavity 64 via the cooling air emitting side opening 63b. Then, the cooling air flowing inside the cavity 64 is introduced to the second radial directional passages 65 that open to the cavity 64 via the cavity side opening 65a.

The second radial directional passages 65 rotate about the central axis RL of the second radial directional passages. As a result, a pressure of the cooling air introduced to the second radial directional passages 65 is raised due to a pumping effect similar to centrifugal compressor. A cooling air flow AF03 shown by an arrow in FIG. 4 flows from the center of the radial direction of the disk 14 to the outside of the radial direction thereof.

The cooling air flowing inside the second radial directional passages 65 is introduced to the cooling passage 133 via the rotor blade side opening 65b. As a result of the cooling passages 133 rotating about the central axis RL, a pressure of the cooling air flowing inside the cooling passage 133 is raised due to a pumping effect similar to a centrifugal compressor. A cooling air flow AF04 shown by an arrow in FIG. 4 flows from the side of the base 131 to the tip section 132 shown in FIG. 3. When the cooling air reaches the tip section 132, the cooling air is emitted from the cooling air emitting opening 136 to combustion gas. As described above, when the cooling air flows through the first radial directional passages 63, the second radial directional passages 65, and the cooling passage 133, a pumping action due to centrifugal force works on the cooling air. In the present embodiment, a starting point of each of the first radial directional passages 63 disposed in the radial direction is disposed near the center of the rotor 50, and the second radial directional passages 65 and the cooling passage 133 shown in FIG. 3 inside the turbine rotor blades 13 are arranged in the described order. Therefore, a pumping effect works effectively.

In the configuration, in the gas turbine 3, pumping force acting on the cooling air becomes bigger than pressure loss that occurs while the cooling air flows through the external passage 68, the shaft directional passage 60, the first radial directional passages 63, and the second radial directional passage 65. Thus, the pumping force functions as a part of force that guides the cooling air to a tip of each of the turbine rotor blades 13.

As a result of the pumping force working effectively on the cooling air flowing through the cooling passage 133, a pressure of the cooling air necessary for air supply can be reduced. When the load of the gas turbine 3 is small and amount of necessary cooling air is small, even an air supply pressure similar to that of atmospheric air is enough to supply the cooling air to a tip of each of the turbine rotor blades 13 that needs to be cooled, as a result of the pumping action working effectively.

The gas turbine system 1 includes the shaft directional passage 60 provided along the central axis RL of the rotor 50 as well as that is communicated with the external passage 68, the first radial directional passages 63 that compresses the cooling air by being provided outwardly from the center of the rotor 50 as well as that is communicated with the shaft directional passage 60, the second radial directional passages 65 of which one of the ends of each is communicated with the first radial directional passages 63 via the cavity 64 as well as the other end is communicated with the exterior of the rotational member via the cooling passages 133, and the external passage 68 that guides the cooling air from the compressor air extraction opening as an air supply to the shaft directional passages as well as that includes an air amount regulating unit.

In the configuration, the gas turbine system 1 is different from a gas turbine shown in conventional examples. The gas turbine system 1 is configured such that the gas turbine system 1 includes, independently of the gas turbine 3, the air flow rate regulating valve 70 on the external passage 68 and the cooler. Therefore, amount and temperature of air can always be adjusted even during operation performed by the gas turbine system 1.

Figure 7:
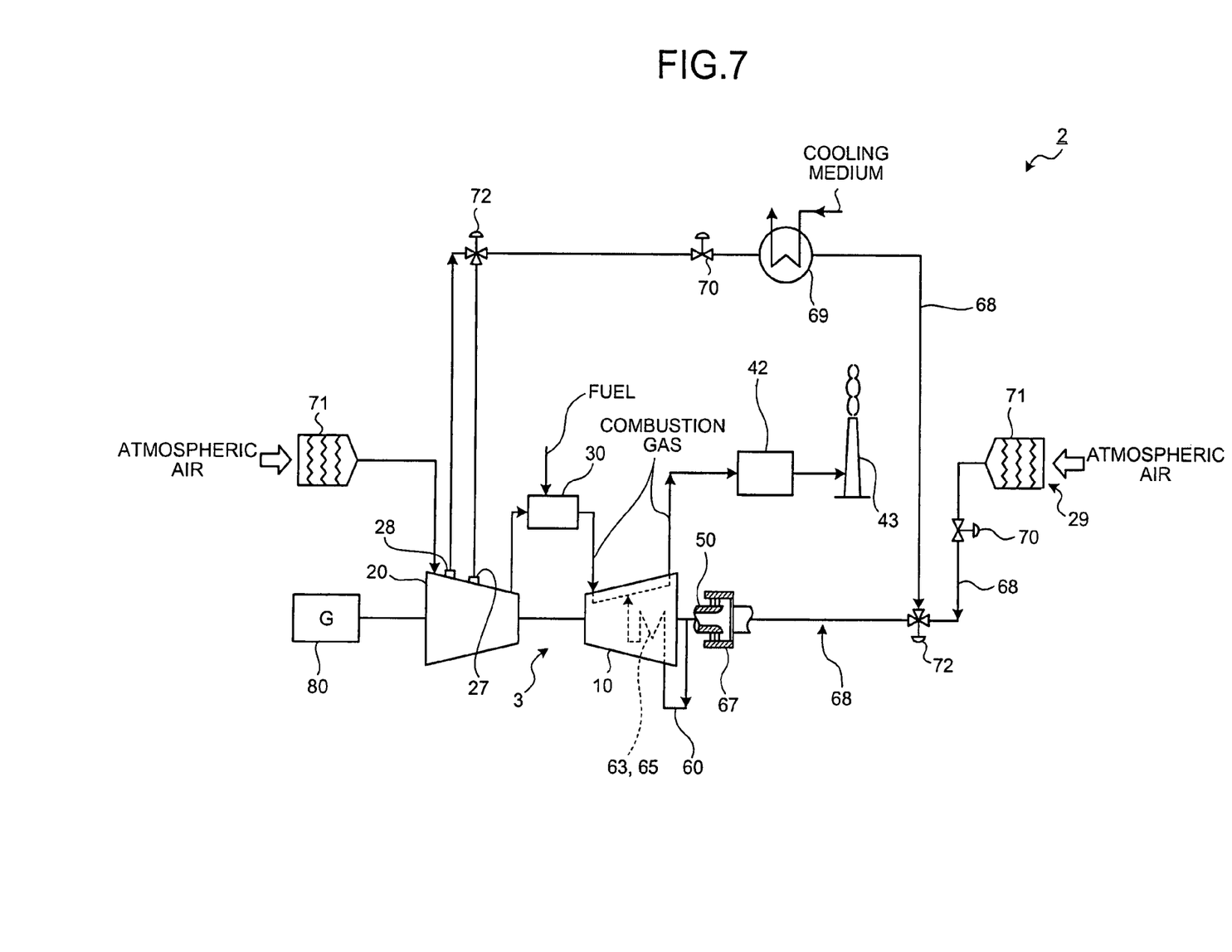
FIG. 7 is an overall view of a gas turbine system according to a second embodiment.

FIG. 7 is an overall view of a gas turbine system according to a second embodiment. In the second embodiment, a plurality of air supplies for the cooling air supplied to the turbine 10 are provided for cooling the turbine rotor blades 13 in a posterior area of the turbine 10.

As shown in FIG. 7, a gas turbine system 2 includes a compressor high pressure air extraction opening 27, a compressor low pressure air extraction opening 28, and an atmospheric air inlet 29 as air supplies. The gas turbine system 2 includes an external passage 68 from each of the air supplies to the shaft end seal 67 provided at a shaft end of the rotor 50 of the turbine 10.

The compressor high pressure air extraction opening 27 and the compressor low pressure air extraction opening 28 can extract compressed air from an intermediate area of the compressor. For the compressor high pressure air extraction opening 27 and the compressor low pressure air extraction opening 28, not only two but also equal to or more than three air extraction openings may be provided if necessary.

In an example shown in FIG. 7, in the gas turbine system 2, high pressure air is extracted from the compressor high pressure air extraction opening 27, near the exit side of the air flow within the compressor 20, and located downstream of the flow of the compressed air, and low pressure air of which the pressure is lower than that of the high pressure air is extracted from the compressor low pressure air extraction opening 28 located upstream of the flow of the compressed air.

When the gas turbine 3 is operated at a low load, atmospheric air can be directly introduced from the atmospheric air inlet 29 via the air filter 71 as an air supply other than the compressor high pressure air extraction opening 27 and the compressor low pressure air extraction opening 28, as shown in FIG. 7. A flow rate of the air introduced from the atmospheric air inlet 29 is adjusted by using the air flow rate regulating valve 70 as an air flow rate adjusting unit. The air introduced from the atmospheric air inlet 29 is comparatively low atmospheric temperature. It is not necessary to cool the air by using the cooler 69. As compressor air extraction openings, both of the compressor high pressure air extraction opening 27 and the compressor low pressure air extraction opening 28 may not have to be provided. Only either of both may be provided.

The air supplies are meant for supplying cooling air to the turbine 10 typically by using either one of the air supplies, or the gas turbine 3 does not introduce cooling air from a plurality of air supplies simultaneously. Switching between air supplies is performed by using a switching valve 72 provided at each of the external passages 68.

In switching air supplies or supply sources of cooling air, the gas turbine 3 may be temporarily halted to switch air supplies, or air supplies may be switched gradually during operation performed by the gas turbine 3.

Selection of an appropriate air supply is decided according to a load condition of the gas turbine 3. When the gas turbine 3 is in the 100% load operation, thermal load on the turbine rotor blades 13 is the most severe and the turbine rotor blades 13 requires the most amount of cooling air.

Thus, when the gas turbine 3 is in high load operation, the compressor high pressure air extraction opening 27 is selected, in which extracting pressure in air supply is highest. When the compressor high pressure air extraction opening 27 is selected and air cooled at an appropriate temperature by the cooler 69 is supplied to the turbine 10, the gas turbine 3 can supply the maximum amount of cooling air to the turbine rotor blades 13. Thus, the gas turbine 3 can achieve the maximum cooling effect.

When the load of the gas turbine is low, the gas turbine 3 introduces cooling air from the atmospheric air inlet 29. When the gas turbine 3 uses the compressor high pressure air extraction opening 27 and the compressor low pressure air extraction opening 28, the cooler 69 is required. When the gas turbine 3 uses the atmospheric air inlet 29 as an air supply, however, the cooler 69 is not required. Thus, because the gas turbine 3 does not have the difference of heat loss between the two arrangements, thermal efficiency of the gas turbine 3 as a whole is increased.

When the atmospheric air inlet 29 is used as an air supply, however, pressure of the air supply is low. Pressure loss occurs in the passage through which the cooling air flows. Therefore, flow rate of air that can be introduced to the turbine 10 is limited. When the gas turbine 3 is in intermediate load, cooling air may be extracted from the compressor low pressure air extraction opening 28. When amount of air needed is less than the 100% load condition and the load is small, and amount of air needed is more than when the atmospheric air inlet 29 is used as an air supply; the gas turbine 3 introduces cooling air from the compressor low pressure air extraction opening 28 to the turbine 10.

Then, pressure of the cooling air introduced to the turbine 10 may be smaller than pressure of the compressor high pressure air extraction opening 27 used during the 100% load operation of the gas turbine. Therefore, the gas turbine 3 can reduce energy loss at the compressor 20.

The gas turbine 3 includes components such as a hand valve and an orifice besides the air flow rate regulating valve 70 as an air amount regulating unit. As switching means for switching air supplies, a switching unit that can be manually switched may be used instead of the switching valve 72.

The gas turbine 3 according to the present embodiment is described such that the gas turbine 3 includes the swirler 62. The present embodiment, however, is not limited thereto. The gas turbine may not include the swirler 62. By providing a swirler, however, pressure loss that occurs when cooling air is introduced from the shaft directional passage 60 to the first radial directional passages 63 can be reduced. Therefore, the gas turbine 3 can preferably prevent the cooling capability from dropping.

In the gas turbine according to the embodiments above, a passage is provided longer in the radial direction thereof than in a conventional gas turbine and pressure of cooling air flowing through the passage is increased due to a pumping action. Cooling air can be supplied to a cooling object from an air supply with pressure lower by the difference of the increased pressure due to the pumping action. Therefore, air can be extracted from a compressor air extraction opening of which pressure is lower than the air pressure at the exit of the compressor as well as amount of the air can be adjusted. Thus, cooling air according to operating status of the gas turbine can be supplied efficiently.

In the gas turbine according to the embodiments above, the air extracted from the compressor air extraction opening is compressed by the compressor and therefore temperature thereof is increased. Air extracted from the compressor air extraction opening can be cooled by the cooling air cooling unit. Thus, the gas turbine can cool a cooling object more efficiently.

In the gas turbine according to the present invention, the air supply is used as atmospheric air inlet that opens to atmospheric air and thus cooling air can be supplied from atmospheric air to a cooling object. Although a conventional gas turbine takes in air from a compressor, the gas turbine according to the present invention can take air in from an atmospheric air intake without extracting cooling air from a compressor. Therefore, the gas turbine according to the present invention does not require high pressure air as an air supply of cooling air, thereby increasing thermal efficiency.

In the gas turbine according to the embodiments above, before the cooling air reaches the radial directional passages, a swirl adding unit provides swirl in the same direction of the rotating radial directional passages to the cooling air. Thus, the cooling air is introduced efficiently from the shaft directional passage to the radial directional passages. Therefore, the gas turbine according to the present invention can prevent thermal efficiency from dropping.

In the gas turbine according to the embodiments above, the external passage is formed of a plurality of external passages, and the external passage includes a switching unit that switches the air supplies. By selecting from the air supplies cooling air having a necessary pressure according to operation status of the gas turbine, the cooling air from the selected air supply can be provided to a cooling object. In the gas turbine, excessive increase of cooling air pressure compared with a necessary pressure is prevented and selection of an appropriate air supply for the load of the gas turbine can be possible. Therefore, the drop of thermal efficiency of the gas turbine as a whole can be prevented.

In a method of operating the gas turbine according to the above embodiments, selection of an appropriate air supply of cooling air for the load of the gas turbine is possible, thus, appropriate air can be used for operation status of the gas turbine, and drop of thermal efficiency of the gas turbine as a whole can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A gas turbine comprising:
a shaft directional passage provided to a rotating member that rotates along a central axis of a rotor, which is a rotating axis of the rotating member, about the central axis, or a rotating axis of the rotating member, and in which cooling air flows along a direction of the rotating axis of the rotor;
a plurality of radial directional passages provided in a circumferential direction of the rotating member, and compressing the cooling air by being provided outwardly from center of the rotor, wherein one end of each of the radial directional passages is communicated with the shaft directional passage and the other end is communicated with exterior of the rotating member; and
an external passage including an air amount regulating unit, wherein one end thereof is communicated with an air supply for taking air in and the other end is communicated with the radial directional passages to introduce the cooling air.

2. The gas turbine according to claim 1, wherein the air supply is a compressor air extraction opening provided on a compressor compressing air.

3. The gas turbine according to claim 2, further comprising a cooling air cooling unit that is provided at the external passage and that cools the cooling air.

4. The gas turbine according to claim 1, wherein the air supply is an atmospheric air inlet that opens to atmospheric air.

5. The gas turbine according to claim 1, further comprising a swirl adding unit that is provided at the shaft directional passage, and that provides swirl in a rotational direction of the rotor to the cooling air flowing through the shaft directional passage.

6. The gas turbine according to claim 1, wherein the external passage is formed of a plurality of external passages, and includes a switching unit that switches the air supply.

7. A method of operating a gas turbine, the method comprising switching an air supply according to load of the gas turbine including:
a shaft directional passage provided to a rotating member that rotates along a central axis of a rotor, which is a rotating axis of the rotating member, about the central axis, or a rotating axis of the rotating member, and in which cooling air flows along a direction of the rotating axis of the rotor;
a plurality of radial directional passages, provided in a circumferential direction of the rotating member, and compressing the cooling air by being provided outwardly from the center of the rotor, wherein one end of each of the radial directional passages is communicated with the shaft directional passage and the other end is communicated with exterior of the rotating member; and
an external passage including a switching unit that switches the air supply and formed of a plurality of passages, wherein one end of each of the passages is communicated with the air supply for taking air in to introduce the cooling air and the other end is communicated with the radial directional passage via a shaft end seal.

* * * * *